United States Patent [19]
Yazdy et al.

[11] Patent Number: 5,603,007
[45] Date of Patent: Feb. 11, 1997

[54] METHODS AND APPARATUS FOR CONTROLLING BACK-TO-BACK BURST READS IN A CACHE SYSTEM

[75] Inventors: Farid A. Yazdy, San Mateo; Michael J. Dhuey, Cupertino, both of Calif.

[73] Assignee: Apple Computer, Inc., Cupertino, Calif.

[21] Appl. No.: 212,081

[22] Filed: Mar. 14, 1994

[51] Int. Cl.⁶ .................................................... G06F 12/08
[52] U.S. Cl. .................... 395/467; 395/403; 395/494; 395/855
[58] Field of Search ................................. 395/400, 425, 395/467, 872, 449, 440, 444, 445, 250, 855, 403, 421.05, 421.03, 494; 364/200 MS File, 900 MS File

[56] References Cited

U.S. PATENT DOCUMENTS

| | | | |
|---|---|---|---|
| 4,794,523 | 12/1988 | Adan et al. | 364/200 |
| 4,884,198 | 11/1989 | Garner et al. | 364/200 |
| 4,912,630 | 3/1990 | Cocheroft, Jr. | 395/425 |
| 5,126,975 | 6/1992 | Handy et al. | 395/425 |
| 5,146,582 | 9/1992 | Begun | 395/500 |
| 5,261,071 | 11/1993 | Lyon | 395/467 |
| 5,265,053 | 11/1993 | Naradone et al. | 365/193 |
| 5,293,603 | 3/1994 | MacWilliams et al. | 395/425 |
| 5,303,364 | 4/1994 | Mayer et al. | 395/467 |
| 5,339,399 | 8/1994 | Lee et al. | 395/425 |
| 5,345,573 | 9/1994 | Bowden, III et al. | 395/400 |
| 5,353,423 | 10/1994 | Hamid et al. | 395/425 |

FOREIGN PATENT DOCUMENTS 0325420  7/1989  European Pat. Off. .

Primary Examiner—Eddie P. Chan
Assistant Examiner—Hiep T. Nguyen
Attorney, Agent, or Firm—Carr, DeFilippo & Ferrell, LLP

[57] ABSTRACT

Circuit arrangements and methods are disclosed for upgrading an 040-based personal computer system using an optional, peripheral add-in card. In one embodiment, the present invention comprises a PowerPC-based microprocessor, such as the MPC601, having one megabyte of on-board direct mapped level 2 external cache memory arranged as tag and data blocks. The PowerPC-based board is inserted into a processor-direct data path sharing the data and address bus with the 040 microprocessor. System random access memory (RAM), I/O, and other functional blocks are present on the main board comprising the 040-based computer. The MPC601 is coupled via address and data buses to the tag cache, a bus translation unit (BTU), a read only memory (ROM) storing the operating system code for the PowerPC microprocessor, the data cache, a dual frequency clock buffer, and other interface components such as a processor-direct data path including address and data latches. When the computer is turned on, the BTU coupled to the data bus sequentially clears all valid bits in the tag cache, whereafter the cache and memory map are enabled. The 040 processor on the main board is disabled after power-up by using the 040 JTAG test port after inactivating the power-on fast reset. By shifting in appropriate RESET, TCK, and TMS patterns, the 040 will be placed in a nonfunctional, high impedance state. However, DRAM present on the motherboard may be accessed by the 601 after a cache miss. DRAM is accessed via a 601–040 transaction translation operation within the BTU, wherein coded tables map the MPC601 transaction into the appropriate 040 transaction.

5 Claims, 8 Drawing Sheets

TWO BACK TO BACK CACHE HIT BURST READ CYCLES

TWO BACK TO BACK CACHE HIT SINGLE READ CYCLES

METHODS AND APPARATUS FOR CONTROLLING BACK-TO-BACK BURST READS IN A CACHE SYSTEM

BACKGROUND OF THE INVENTION

1. Field of the Invention

The present invention relates generally to personal computer systems. More particularly, the present invention relates to cost effective methods and arrangements to upgrade a personal computer using a peripheral processor card.

2. Art Background

Personal computers have proliferated since their first availability, with an increasingly wide variety and selection of computers now offering many degrees of functionality, architecture, etc. One popular family of personal computers, the Macintosh® manufactured and sold by Apple Computer, Inc., has been built upon the 68000 family of microprocessors manufactured by Motorola, Inc. Since its introduction in 1984, the Macintosh® (registered trademark of Apple) has evolved from a small, user-friendly but slow computer having 128 kilobytes (kB) of system memory, to the large desktop and floor Quadra® models using the faster 68040 central processor unit (CPU) and having base system memory configuration of 8 megabytes (MB) expandable to 64 MB and beyond. Many millions of Macintosh computers have been sold and are in use throughout the world.

Apple, in adopting a new hardware architecture to carry forward into the next century, has selected the reduced instruction set computer (RISC) PowerPC™ architecture developed by International Business Machines (IBM) and implemented in the PC601 microprocessor (PowerPC is a trademark of IBM). Beginning in early 1994, Macintosh computers will all soon incorporate PowerPC microprocessors which, depending upon the code executing on it, will be many times faster than current state of the art Macintosh computers using the conventionally architected 68040 microprocessor. However, many owners and users of 040-based computers, particularly small business and home users, will not want to or be capable of immediately replacing their existing machines with the new PowerPC based machines. In such cases, it would be desirable to provide such users with an alternative, less costly but comparably functional conversion path, namely a peripheral add-in card which would effectively upgrade the existing computer system with PowerPC functionality.

Add-in peripheral processor cards have been used with considerable success to provide numerical computation acceleration, as well as cross-architecture or cross-platform computing solutions. One example of a cross-platform peripheral add-in card is the Orange card manufactured and sold by Orange Solutions, which incorporates a 80486-based microprocessor using the X86 architecture developed by Intel Corporation. When added to a 040-based computer, for example the Macintosh Quadra, the X86 peripheral card enables a user to run both application and utility programs on either processor. Peripheral cards typically include all interface, memory, and input/output (I/O) components in addition to the processor providing the essential function of the add-in card. However, such peripheral cards are inherently expensive because they necessarily include the cost of the associated circuit elements, which are duplicative to the components already present in the computer.

As will be described in the following detailed description, the present invention provides a cost effective arrangement for an optional, high performance PowerPC-based peripheral add-in card to be inserted into a 040-based personal computer. The peripheral card containing the PowerPC microprocessor functions so as to override the 040 processor present on the motherboard of the computer, while sharing essential functional components of the 040 system, such as memory and I/O, thus improving computer performance to the equivalent of a PowerPC computer.

SUMMARY OF THE INVENTION

Circuit arrangements and methods are disclosed for upgrading an 040-based personal computer system using an optional, peripheral add-in card. In one embodiment, the present invention comprises a PowerPC-based microprocessor, such as the MPC601, having one megabyte of on-board direct mapped level 2 external cache memory arranged as tag and data blocks. The PowerPC-based board is inserted into a processor-direct data path sharing the data and address bus with the 040 microprocessor. System random access memory (RAM), I/O, and other functional blocks are present on the main board comprising the 040-based computer. The MPC601 is coupled via an address bus to the tag cache, which is conventionally organized to have address bits and one valid bit for each entry. The MPC601 is further coupled via a data bus to a bus translation unit (BTU), a read only memory (ROM) storing the operating system code for the PowerPC microprocessor, the data cache, a dual frequency clock buffer, and other interface components such as a processor-direct data path including address and data latches. The on-board address and data buses are clocked at half the frequency of the PowerPC microprocessor.

When the computer is turned on, the valid bits of the on-board level 2 cache are reset to zero by setting a cache invalidate bit in a register within the BTU, thereby causing the BTU coupled to the data bus to gain control of the PowerPC address bus and thereafter sequentially clearing all valid bits in the tag cache. After the cache has been cleared, the cache can be enabled by setting an appropriate register within the BTU, whereafter a memory map for the PowerPC MPC601 is enabled. Cache entries are made during a burst read by the MPC601 when a cache inhibit pin is inactive, and may be from ROM, RAM, or from any other cacheable space. Once filled and running, any updates written to the on-board cache will write-through to the system DRAM.

The 040 processor on the main board is disabled after power-up by using the 040 JTAG test port after inactivating the power-on fast reset. By shifting in appropriate RESET, TCK, and TMS patterns, the 040 will be placed in a nonfunctional, high impedance state. However, DRAM present on the motherboard may be accessed by the 601 after a cache miss. DRAM is accessed via a 601–040 transaction translation operation within the BTU, wherein coded tables map the MPC601 transaction into the appropriate 040 transaction. In the present invention, the transaction translation also includes conversion of the 64-bit PowerPC data path to 32-bit 040 data path format. Due to the reduced data path available for 040 instructions, PowerPC 601 instructions may require additional clock cycles to complete accesses to components on the main board.

BRIEF DESCRIPTION OF THE DRAWINGS

The present invention will be understood more fully from the detailed description given below and from the accompanying drawings of the preferred embodiment of the invention in which.

DETAILED DESCRIPTION OF THE INVENTION

The present invention discloses circuit arrangements and methods for optionally upgrading an 040-based personal computer system using a peripheral add-in card comprising a PowerPC-based MPC601 microprocessor. In the following description, for purposes of explanation, specific values, timing diagrams, dimensions, and configurations are set forth in order to provide a thorough understanding of the present invention. However, it will be apparent to one skilled in the art that the present invention may be practiced without these specific details. In other instances, well known systems are shown in diagrammatic or block diagram form in order not to obscure the present invention unnecessarily.

Figure 1:
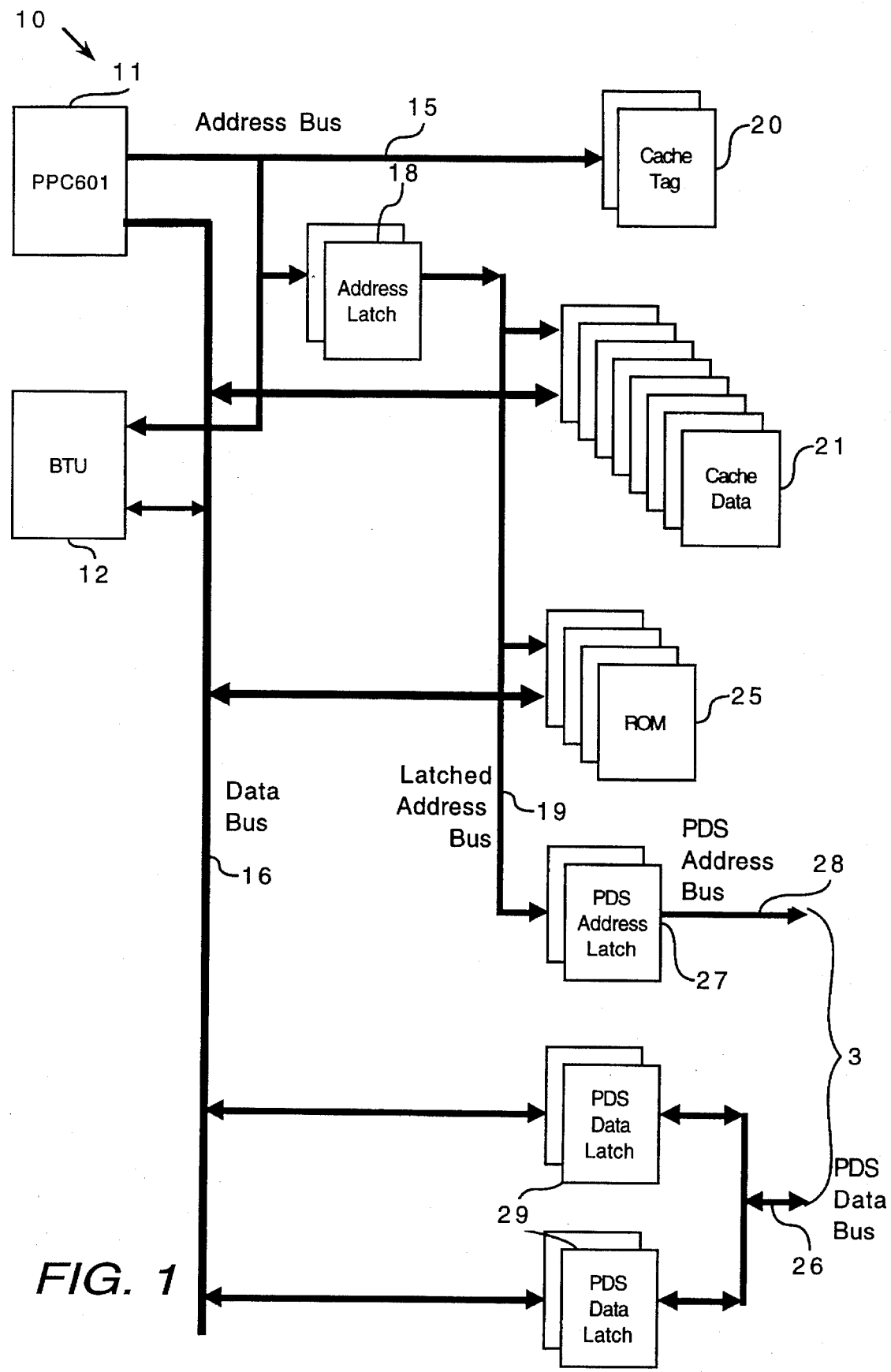
FIG. 1 is a block diagram illustration of a PowerPC peripheral processor card comprising the present invention.
Figure 2:
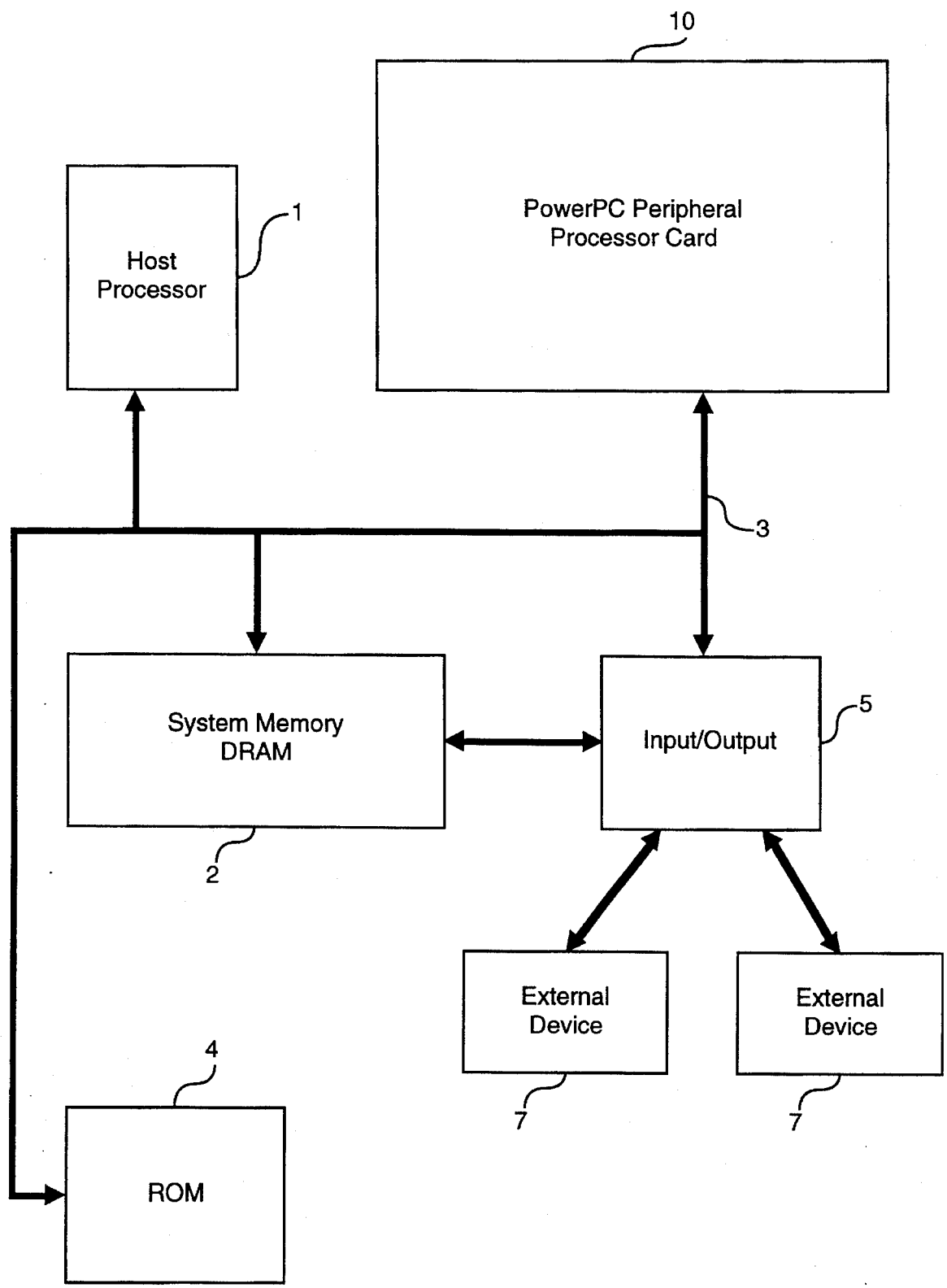
FIG. 2 illustrates a first embodiment of the host computer system with the peripheral processor card of the present invention installed.

Reference is now made to FIG. 1, wherein is shown a block diagram of a PowerPC-based peripheral card 10 forming the present invention. In FIG. 1, a PowerPC microprocessor 11 is functionally coupled via an address bus 15 to a cache tag memory block 20, and further via a first address latch arrangement 18 and a latched-address bus 19 to a data cache memory block 21, a ROM memory block 25. Microprocessor 11 is also coupled via a second address latch arrangement 27 to a processor direct address bus 28 which is a system address bus for the host (not shown), for example a 68040 microprocessor. Microprocessor 11 is further coupled via a data bus 16 to a bus translator unit (BTU) 12 whose function will be described below in more detail. Data bus 16 also interconnects processor 11 to cache data memory block 21, ROM memory block 25, as well as a processor direct data bus 26 via one or more processor direct data latch arrangements 29, as shown in FIG. 1. As in the case of the processor direct address bus 28, processor direct data bus 26 is shared with the host processor, wherein address bus 28 and data bus 26 together comprise a shared address/data system data path 3 (FIG. 2).

Notably in the present invention, system memory for processor 11 consists of dynamic RAM (DRAM) provided by using the system DRAM 2 located on the host main processor board external to the peripheral card 10. With brief reference to FIG. 2, the peripheral processor card 10 of the present invention is shown in a block diagram arrangement with the host computer system. In FIG. 2, a host processor 1, preferably a 68040 microprocessor, is conventionally interconnected via an address and data bus 3 to a system memory consisting of DRAM 2, system ROM 4, and an I/O control block 5 interfacing between processor 1 and one or more external devices 7. Thus, system memory DRAM 2 is shared between processor 11 and processor 1, although DRAM 2 is only accessed at any time by only one of the processors owing to their incompatible data and address formats.

Figure 3:
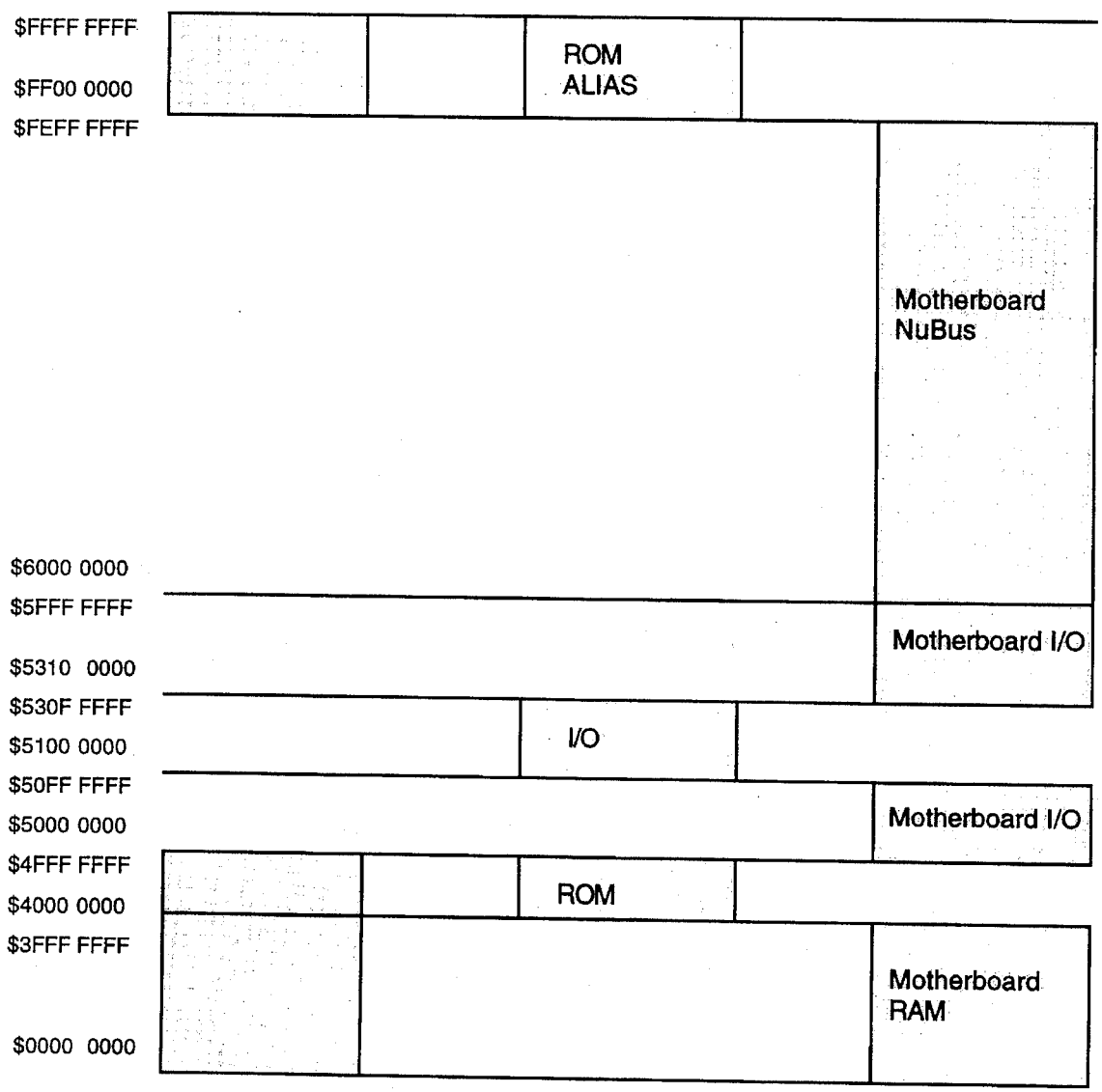
FIGS. 3 and 4 depict the memory map for the peripheral processor card with respect to the host system.
Figure 4:
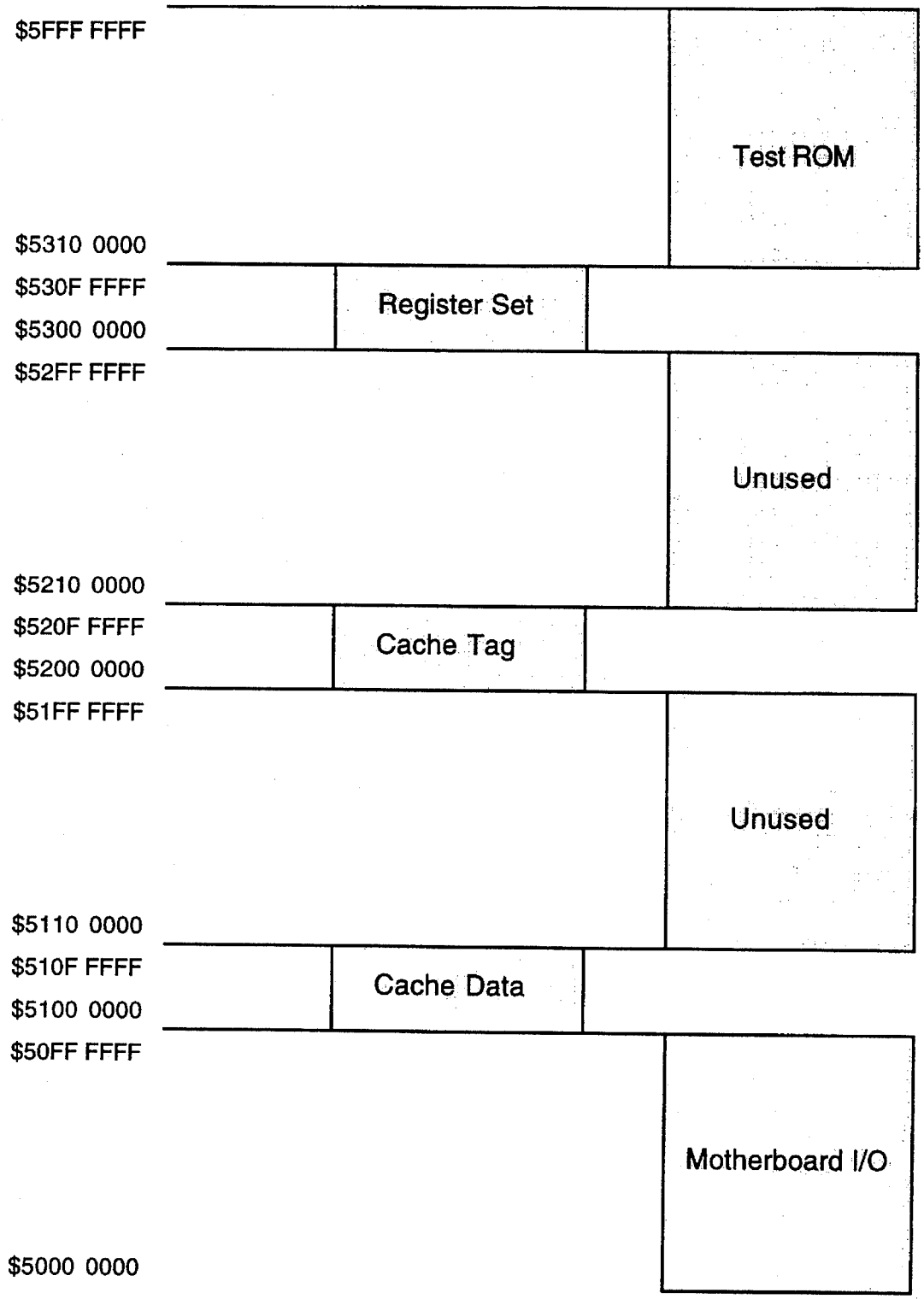

The tag and data cache memory blocks 20 and 21 in the present invention are arranged as a one megabyte (MB) direct mapped level 2 cache. Entries in cache blocks 20 and 21 are allocated upon a burst read from processor 11, and are updated during write operations to cache blocks 20 and 21, with write-through to system memory DRAM 2 (FIG. 2). Referring briefly to FIGS. 3 and 4, an address map for the peripheral processor card is illustrated for all functional components of the integrated host-peripheral system. The cache arrangement is used only for the DRAM 2 and ROM 4 portions of the address map for the peripheral card 10. Cache tag and data blocks do not snoop any other logical address spaces, such as might be provided for other peripheral cards including any NuBus cards which may have access to system DRAM 2. The foregoing is consistent with Apple's software model implemented with 68040-based computers, wherein portions of memory used for direct memory access operations are marked as non-cacheable in the address translation tables of the 040 processor. As a result of the above model, two methods exist for flushing the cache memory blocks. The first method entails flushing the entire cache 21 if, during operation, segments of system memory 2 are initially marked as cacheable, then marked non-cacheable, and later again marked as cacheable. In the first case, flushing would be necessary because old (stale) data may remain in the cache 21 after changes to system memory 2 have been made while the system memory was marked as non-cacheable, during which time the corresponding cache blocks will not have been updated. The second method entails identifying only which particular ones of the 32K pages comprising the entire 1 MB of memory have been made cacheable again after having been made noncacheable. In the second case, only those memory pages of 32 kB each, corresponding to those tags noted to have been made cacheable, will be flushed, resulting in an overall cache performance improvement for the peripheral processor card.

The cache arrangement shown in FIG. 1 is implemented using two fast (15 nanosecond) 32 kB×8 static RAM devices for tag information and eight 128kB×8 static RAM devices for data information. Each tag entry in the tag cache 20 corresponds to the address of a block of four 64 bit data entries in the data cache 21. Logically, the tag cache 20 is arranged as 32 kB×16 having 12 bits for address and 1 valid bit (FIG. 7), whereas the data cache 21 is arranged as 128 kB×64.

In operation, when the peripheral card 10 (and the computer) is first powered up, the static cache memory (20 and 21) contains arbitrary unknown values. In order to begin using the cache, all valid bits for all cache locations are first reset to zero. The resetting is accomplished by setting a "cache invalidate" bit in a control register in BTU 12, whereafter BTU 12 gains control of address bus 15 and generates all 32K addresses of the tag cache memory 20, simultaneously clearing the valid bit in each tag entry location. Because the BTU 12 takes over address bus 15 completely, processor 11 does not intermittently check for address bus availability; rather processor 11 simply waits until BTU 12 releases address bus 15 after clearing all valid bits. After all valid bits for all cache entries have been cleared, the cache can be enabled, which is accomplished by setting the appropriate cache enable bit in the control register of BTU 12. Memory space is then allocated in accordance with the memory map described above in connection with FIG. 3. Entries to the data cache 21 are created during a burst read operation by processor 11 when the cache inhibit pin on processor 11 is inactive. Data cache entries are also made whenever data cache 20 is enabled, when the address lines A[31–20] (FIG. 7) do not match corresponding tag data bits 0–11, or when the valid bit (bit 12) is zero. The tag cache is written with addresses A[31–20] being written to tag data bits 0–11 and valid bit set to "1".

In order that multiple burst read transactions by the processor 11 to the cache (block 20 and 21) may be efficiently accomplished using minimum clock cycles, it is beneficial to maintain the address bits of the cache until a burst read cycle has been fully transacted. As shown in FIG. 1, address latch 18 permits the address bits to be held throughout a burst read operation, and then later used in a subsequent burst read operation without reforming the entire address, thereby saving one clock cycle. Thus, in consecutive burst read operations, address latch 18 can save 16% in latency compared to simple buffered arrangements. Because the present invention entails only a single active processor, it is known there will never be a retry operation. Accordingly, rather than waiting until the end of a burst read transaction, the 601 control block 33 generates a signal which acknowledges the read early, and therefore the processor can present the next address one cycle early, while the latch 18 holds the previously issued address.

When a cache entry is made in the address space of on-board ROM 25, ROM 25 is accessed and BTU 12 generates address bits 3–4 to ROM 25 and data cache 21. The data cache 21 and the PowerPC processor 11 read the data coming from ROM 25 as BTU 12 increments address bits 3-4. Alternatively, when a cache entry is made in the address space of DRAM 2, it is necessary that the motherboard be accessed to retrieve the data. This is a compound transaction because a processor 11 burst reads twice as much data compared with the 68040 host processor 1.

To overcome the bandwidth disparity between processor 1 and processor 11, as illustrated in Table 1a below burst read cycles by processor 11 are encoded so as to conform with 040 instructions and datapath available on the host processor main circuit board. In particular, BTU 12 generates SIZ[1:0] and A[4:0] signals to processor 1 according to processor 11's TSIZ[2:0], A[2:0], and TBST_ signals:

TABLE 1a

Read translation from 601 to 68040 bus signals

| Size | TBST_ | TSIZ0:2 | A29-31 | 601 0 | 1 | 2 | 3 | 4 | 5 | 6 | 7 | SIZ1:0 | A2:0 | D31:24 | D23:16 | 68040 D15:8 | D7:0 |
|---|---|---|---|---|---|---|---|---|---|---|---|---|---|---|---|---|---|
| Byte | 1 | 001 | 000 | A | — | — | — | — | — | — | — | 01 | 000 | A | — | — | — |
|  | 1 | 001 | 001 | — | A | — | — | — | — | — | — | 01 | 001 | — | — | — | — |
|  | 1 | 001 | 010 | — | — | A | — | — | — | — | — | 01 | 010 | — | — | — | A |
|  | 1 | 001 | 011 | — | — | — | A | — | — | — | — | 01 | 011 | — | — | — | — |
|  | 1 | 001 | 100 | — | — | — | — | A | — | — | — | 01 | 100 | A | — | — | — |
|  | 1 | 001 | 101 | — | — | — | — | — | A | — | — | 01 | 101 | — | — | — | — |
|  | 1 | 001 | 110 | — | — | — | — | — | — | A | — | 01 | 110 | — | — | — | A |
|  | 1 | 001 | 111 | — | — | — | — | — | — | — | A | 01 | 111 | — | — | — | — |
| Half-Word | 1 | 010 | 000 | A | B | — | — | — | — | — | — | 10 | 000 | A | — | — | B |
|  | 1 | 010 | 001 | — | A | B | — | — | — | — | — | 10 | 001 | — | B | A | — |
|  | 1 | 010 | 010 | — | — | A | B | — | — | — | — | 10 | 010 | — | B | A | — |
|  | 1 | 010 | 011 | — | — | — | A | B | — | — | — | 10 | 011 | — | — | — | B A |
|  | 1 | 010 | 100 | A | — | — | — | A | B | — | — | 10 | 100 | A | — | — | B |
|  | 1 | 010 | 101 | — | — | — | — | — | A | B | — | 10 | 101 | — | B | A | — |
| Three Byte | 1 | 010 | 110 | — | B | C | — | — | — | — | — | 01 | 110 | C | B | A | — |
|  | 1 | 010 | 111 | — | A | — | — | — | — | — | — | 01 | 111 | B A | — | — | — |
|  | 1 | 011 | 000 | — | — | — | — | C | B | A | — | 10 | 000 | C | B | A | — |
|  | 1 | 011 | 001 | — | — | C | B | A | — | — | — | 10 | 001 | — | C | B | A |
|  | 1 | 011 | 010 | — | — | — | C | B | A | — | — | 10 | 010 | — | C | B | A |
|  | 1 | 011 | 011 | — | — | — | — | — | C | B | A | 10 | 011 | — | — | — | C B A |
|  | 1 | 011 | 100 | — | — | — | — | C | B | A | — | 10 | 100 | C | B | A | — |
| Word | 1 | 011 | 101 | — | — | C | B | A | — | — | — | 01 | 101 | — | C | B | A |
|  | 1 | 011 | 110 | — | — | — | — | — | — | D C | B A | 00 | 110 | D | C | B | A |
|  | 1 | 100 | 000 | — | B | — | — | — | — | — | — | 01 | 000 | D | C | B | A |
|  | 1 | 100 | 001 | — | — | C | B | A | — | — | — | 10 | 010 | D | C | B | A |
|  | 1 | 100 | 010 | — | — | — | — | — | — | — | — | 10 | 100 | C | B | A | — |
|  | 1 | 100 | 011 | — | — | — | D | C | B | A | — | 10 | 011 | — | D | C | B |
| Five Byte | 1 | 100 | 100 | — | — | — | D | C | B | A | — | 10 | 100 | — | — | — | D |
|  | 1 | 100 | 101 | — | — | — | — | — | — | A | — | 10 | 110 | — | — | — | — |
|  | 1 | 101 | 110 | — | B | — | D | — | — | — | — | 10 | 110 | — | B | A | C |
|  | 1 | 101 | 111 | — | — | C | — | E | B A | — | — | 01 | 111 | A | B | D C | C B A D |
|  | 1 | 100 | 000 | A | — | — | — | — | — | — | — | 00 | 000 | D | C | B | A |

TABLE 1a-continued

Read translation from 601 to 68040 bus signals

| Size | TBST_ | TSIZ0:2 | A29-31 | 601 0 | 1 | 2 | 3 | 4 | 5 | 6 | 7 | SIZ1:0 | A2:0 | D31:24 | D23:16 | 68040 D15:8 | D7:0 |
|---|---|---|---|---|---|---|---|---|---|---|---|---|---|---|---|---|---|
|  | 1 | 101 | 001 | — | A | B | C | D | E | — | — | 01 | 100 | E | — | — | — |
|  | 1 | 101 | 010 | — | — | A | B | C | D | E | — | 01 | 001 | — | A | B | C |
|  |  |  |  |  |  |  |  |  |  |  |  | 10 | 010 | D | E | A | B |
|  | 1 | 101 | 011 | — | — | — | A | B | C | D | E | 01 | 011 | C | D | E | — |
|  |  |  |  |  |  |  |  |  |  |  |  | 10 | 100 | — | — | A | E |
|  | 1 | 101 | 100 | — | — | — | — | A | B | C | D | 10 | 100 | B | C | D | E |
|  | 1 | 101 | 101 | — | — | — | — | — | A | B | C | 01 | 110 | A | E | D | C |
|  | 1 | 101 | 110 | — | — | — | — | — | — | A | B | 00 | 000 | — | — | C | B |
|  | 1 | 101 | 111 | — | — | — | — | — | — | — | A | 00 | 000 | — | — | — | A |
|  | 1 | 110 | 000 | A | B | C | D | E | F | — | — | 01 | 100 | — | — | — | — |
| Six Byte | 1 | 110 | 001 | — | A | B | C | D | E | F | — | 10 | 001 | — | — | B | C |
|  |  |  |  |  |  |  |  |  |  |  |  | 01 | 100 | A | E | F | B |
|  | 1 | 110 | 010 | — | — | A | B | C | D | E | F | 10 | 010 | — | E | A | — |
|  | 1 | 110 | 011 | — | — | — | A | B | C | D | E | 10 | 011 | D | — | F | E |
|  |  |  |  |  |  |  |  |  |  |  |  | 01 | 100 | C | D | A | — |
|  | 1 | 110 | 100 | — | — | — | — | A | B | C | D | 10 | 100 | B | C | D | E |
|  |  |  |  |  |  |  |  |  |  |  |  | 10 | 101 | — | — | — | — |
|  | 1 | 110 | 101 | — | A | B | C | D | E | F | — | 01 | 110 | — | B | C | F |
|  |  |  |  |  |  |  |  |  |  |  |  | 10 | 111 | — | F | A | A |
|  |  |  |  |  |  |  |  |  |  |  |  | 10 | 000 | — | — | E | E |
|  | 1 | 111 | 000 | — | A | B | C | D | E | F | G | 01 | 100 | E | E | F | D |
| Seven Byte | 1 | 111 | 001 | — | — | A | B | C | D | E | F | 10 | 001 | D | D | A | — |
|  | 1 | 111 | 010 | — | — | — | A | B | C | D | E | 11 | 010 | C | — | — | — |
|  |  |  |  |  |  |  |  |  |  |  |  | 10 | 100 | — | — | E | — |
|  | 1 | 111 | 100 | — | — | — | — | A | B | C | D | 10 | 100 | B | C | D | E |
|  |  |  |  |  |  |  |  |  |  |  |  | 01 | 101 | A | B | — | F |
|  | 1 | 111 | 110 | — | — | — | — | — | A | B | C | 00 | 110 | — | A | — | A |
|  | 1 | 111 | 111 | — | — | — | — | — | — | A | B | 01 | 111 | — | E | E | E |
|  | 1 | 000 | 000 | — | — | — | — | — | — | — | A | 00 | 000 | — | — | — | D |
| Double Word | 1 | 000 | 001 | — | A | B | C | D | E | F | G | 01 | 001 | — | — | G | H |
|  |  |  |  |  |  |  |  |  |  |  |  | 10 | 010 | — | — | B | C |

TABLE 1a-continued

Read translation from 601 to 68040 bus signals

| Size | TBST | TSIZ0:2 | A29-31 | 601 0 | 1 | 2 | 3 | 4 | 5 | 6 | 7 | SIZ1:0 | A2:0 | D31:24 | D23:16 | D15:8 | D7:0 |
|---|---|---|---|---|---|---|---|---|---|---|---|---|---|---|---|---|---|
| | 1 | 000 | 010 | — | — | A | B | C | D | E | F | 00 | 100 | D | E | F | G |
| | 1 | | | | | | | | | | | 10 | 010 | | | A | B |
| | 1 | 000 | 011 | — | — | — | A | B | C | D | E | 00 | 100 | C | D | E | F |
| | 1 | | | | | | | | | | | 01 | 011 | | | | A |
| | 1 | 000 | 100 | — | — | — | — | A | B | C | D | 00 | 100 | B | C | D | E |
| | 1 | 000 | 101 | — | — | — | — | — | A | B | C | 00 | 101 | A | B | C | D |
| | 1 | | | | | | | | | | | 10 | 110 | | | | |
| | 1 | 000 | 110 | — | — | — | — | — | — | A | B | 01 | 111 | | B | A | |
| | 0 | 010 | 111 | A | B | C | D | E | F | G | H | 11 | | | | | |
| 8 Word Burst | 0 | 010 | 00000 | A | B | C | D | E | F | G | H | | 00000 | A | B | C | D |
| | | | | I | J | K | L | M | N | O | P | | 01000 | E | F | G | H |
| | | | | Q | R | S | T | U | V | W | X | 11 | 10000 | I | J | K | L |
| | | | | Y | Z | AA | AB | AC | AD | AE | AF | | 11000 | M | N | O | P |
| | | | | | | | | | | | | | 11100 | Q | R | S | T |
| | | | | | | | | | | | | | | U | V | W | X |
| | | | | | | | | | | | | | | Y | Z | AA | AB |
| | | | | | | | | | | | | | | AC | AD | AE | AF |
| 8 Word Burst | 0 | 010 | 10000 | A | B | C | D | E | F | G | H | 11 | 10000 | A | B | C | D |
| | | | | I | J | K | L | M | N | O | P | | 10100 | E | F | G | H |
| | | | | Q | R | S | T | U | V | W | X | | 11000 | I | J | K | L |
| | | | | Y | Z | AA | AB | AC | AD | AE | AF | | 11100 | M | N | O | P |
| | | | | | | | | | | | | | 00000 | Q | R | S | T |
| | | | | | | | | | | | | | 00100 | U | V | W | X |
| | | | | | | | | | | | | | 01000 | Y | Z | AA | AB |
| | | | | | | | | | | | | | 01100 | AC | AD | AE | AF |

As is immediately clear from the above Table 1a, because of the disparity in datapath width between the 64-bit wide PowerPC processor 11 and the 32-bit wide 68040 processor 1, multiple read operations may be necessary to build up the composite data expected by the 64 bit PowerPC processor. In particular, for any multibyte transfer which is not encodable according to the two bit encoding scheme (i.e., 1, 2, or 4 bytes), then the BTU 12 will have to make multiple read accesses to acquire the remaining bytes. The forgoing is especially apparent when enacting 5, 6, 7, or 8 byte reads, as well as during 3 byte reads, and during burst reads. Accordingly, the BTU 12 is constructed as a gate array synthesizing the following relation to encode the byte ordering on the 32 bit wide data path to system memory 2 on the host main board:

$$3+X+a(2+X),$$

where a is the number of 68040 cycles - 1.

Analogous to the read operations described above, write operations initiated by PowerPC processor 11 to system DRAM 2 are encoded from the 64 bit convention to the 32 bit datapath and format of the host system, as illustrated in Table 1b below:

TABLE 1b

Write translation from 601 to 68040 bus signals

| Size | TBST | TSIZ0:2 | A29-31 | 601 0 | 1 | 2 | 3 | 4 | 5 | 6 | 7 | SIZ1:0 | A2:0 | D31:24 | D23:16 | 68040 D15:8 | D7:0 |
|---|---|---|---|---|---|---|---|---|---|---|---|---|---|---|---|---|---|
| Byte | 1 | 001 | 000 | A | — | — | — | — | — | — | — | 01 | 000 | A | — | — | — |
|  | 1 | 001 | 001 | — | A | — | — | — | — | — | — | 01 | 001 | A | — | — | — |
|  | 1 | 001 | 010 | — | — | A | — | — | — | — | — | 01 | 010 | — | — | — | A |
|  | 1 | 001 | 011 | — | — | — | A | — | — | — | — | 01 | 011 | — | — | — | A |
|  | 1 | 001 | 100 | — | — | — | — | A | — | — | — | 01 | 100 | A | — | — | — |
|  | 1 | 001 | 101 | — | — | — | — | — | A | — | — | 01 | 101 | A | — | — | — |
|  | 1 | 001 | 110 | — | — | — | — | — | — | A | — | 01 | 110 | — | — | — | A |
|  | 1 | 001 | 111 | — | — | — | — | — | — | — | A | 01 | 111 | — | — | — | A |
| Half-Word | 1 | 010 | 000 | A | — | — | — | — | — | — | — | 10 | 000 | A | — | — | — |
|  | 1 | 010 | 001 | — | B | A | — | — | — | — | — | 10 | 001 | B | A | — | — |
|  | 1 | 010 | 010 | — | — | B | A | — | — | — | — | 10 | 010 | — | — | B | A |
|  | 1 | 010 | 011 | — | — | — | B | A | — | — | — | 10 | 011 | — | — | B | A |
|  | 1 | 010 | 100 | — | — | — | — | A | B | — | — | 10 | 100 | A | B | — | — |
|  | 1 | 010 | 101 | — | — | — | — | — | B | A | — | 10 | 101 | B | A | — | — |
|  | 1 | 010 | 110 | — | — | — | — | — | — | B | A | 10 | 110 | — | — | B | A |
|  | 1 | 010 | 111 | — | A | — | — | — | — | — | — | 10 | 111 | — | — | — | A |
| Three Byte | 1 | 011 | 001 | — | B | A | — | — | — | — | — | 10 | 000 | A | B | — | — |
|  | 1 | 011 | 010 | — | — | C | B | A | — | — | — | 10 | 001 | — | B | A | — |
|  | 1 | 011 | 011 | — | — | — | B | C | B | A | — | 10 | 010 | — | C | B | A |
|  | 1 | 011 | 100 | — | — | — | — | B | A | C | — | 10 | 011 | C | — | — | B |
|  | 1 | 011 | 101 | — | — | — | — | — | C | B | A | 10 | 100 | C | B | A | — |
| Word | 1 | 100 | 110 | — | — | — | — | — | — | C | B | 10 | 101 | — | C | B | A |
|  | 1 | 011 | 111 | — | B | A | — | — | — | — | — | 10 | 110 | — | — | C | B |
|  | 1 | 011 | 000 | — | — | — | — | D | C | B | A | 00 | 000 | D | C | B | A |
|  | 1 | 100 | 001 | — | — | A | — | — | — | — | — | 10 | 001 | — | — | D | A |
|  | 1 | 100 | 010 | — | — | — | A | — | — | — | — | 10 | 010 | — | D | C | B |
|  | 1 | 100 | 011 | — | — | — | — | C | B | A | — | 10 | 011 | C | C | B | A |
|  | 1 | 100 | 100 | — | — | — | — | — | A | — | — | 01 | 100 | B | B | A | — |
|  | 1 | 100 | 101 | — | — | — | — | — | — | A | — | 10 | 101 | A | A | — | — |
|  | 1 | 100 | 110 | — | — | — | — | — | — | — | B | 10 | 110 | — | — | D | B |

TABLE 1b-continued

Write translation from 601 to 68040 bus signals

| | | | | | | | | | | | | | | | | | 68040 | |
| Size | TBST_ | TSIZ0:2 | A29-31 | 601 0 | 1 | 2 | 3 | 4 | 5 | 6 | 7 | SIZ1:0 | A2:0 | D31:24 | D23:16 | D15:8 | D7:0 |
|---|---|---|---|---|---|---|---|---|---|---|---|---|---|---|---|---|---|
| Five Byte | 1 | 100 | 111 | — | — | — | — | — | — | — | A | 01 | 111 | A | — | — | A |
| | 1 | 101 | 000 | A | B | C | D | E | — | — | — | 00 | 000 | E | B | C | D |
| | 1 | 101 | 001 | — | A | B | C | D | — | — | — | 01 | 100 | — | — | — | — |
| | | | | | | | | | | | | 01 | 001 | D | A | — | — |
| | | | | | | | | | | | | 01 | 010 | — | E | B | C |
| | 1 | 101 | 010 | — | — | A | B | C | D | — | — | 10 | 010 | C | D | A | B |
| | 1 | 101 | 011 | — | — | — | A | B | C | D | E | 10 | 100 | — | — | — | — |
| | | | | | | | | | | | | 10 | 010 | B | C | A | E |
| | 1 | 101 | 100 | — | — | — | — | B | C | D | E | 10 | 000 | B | C | D | E |
| | 1 | 101 | 101 | — | — | — | — | — | — | C | B | 10 | 100 | — | — | — | B |
| | | | | | | | | | | | | 10 | 110 | A | B | D | A |
| Six Byte | 1 | 101 | 110 | — | — | — | — | E | F | — | — | 01 | 111 | — | — | — | — |
| | 1 | 110 | 000 | A | B | C | D | — | — | — | — | 00 | 000 | — | — | — | C |
| | | | | | | | | | | | | 10 | 100 | — | — | B | — |
| | 1 | 110 | 001 | — | A | B | C | D | E | — | F | 01 | 001 | C | B | F | B |
| | 1 | 110 | 010 | — | — | A | B | C | D | E | — | 10 | 010 | B | A | A | F |
| | | | | | | | | | | | | 10 | 100 | — | E | E | A |
| | 1 | 110 | 100 | — | — | — | A | B | C | D | C | 10 | 100 | — | D | D | E |
| | 1 | 110 | 101 | — | — | — | — | A | B | C | D | 10 | 101 | — | C | C | D |
| | | | | | | | | | | | | 10 | 110 | — | B | B | — |
| Seven Byte | 1 | 110 | 110 | — | — | — | — | — | A | G | G | 01 | 110 | — | — | — | C |
| | 1 | 111 | 000 | — | — | — | — | E | F | F | F | 01 | 111 | A | — | — | — |
| | 1 | 111 | 001 | — | A | B | C | D | E | F | E | 00 | 000 | E | B | B | B |
| | | | | | | | | | | | | 10 | 001 | — | F | F | F |
| | 1 | 111 | 010 | — | — | A | B | C | D | E | D | 01 | 010 | D | A | A | A |
| | 1 | 111 | 011 | — | — | — | A | B | C | D | C | 10 | 011 | C | E | E | E |
| | 1 | 111 | 100 | — | — | — | — | A | B | C | B | 10 | 100 | — | D | D | D |
| | 1 | 111 | 101 | — | — | — | — | — | A | B | A | 10 | 101 | — | C | C | — |
| | 1 | 111 | 110 | — | — | — | — | — | — | G | G | 10 | 110 | B | B | A | A |
| | 1 | 111 | 111 | — | — | — | — | — | — | — | H | 10 | 111 | — | — | — | — |
| Double Word | 1 | 000 | 000 | A | B | C | D | E | F | G | H | 00 | 000 | A | B | C | D |

TABLE 1b-continued

Write translation from 601 to 68040 bus signals

| Size | TBST_ | TSIZ0:2 | A29-31 | 601 0 | 1 | 2 | 3 | 4 | 5 | 6 | 7 | SIZ1:0 | A2:0 | D31:24 | D23:16 | D15:8 | D7:0 |
|---|---|---|---|---|---|---|---|---|---|---|---|---|---|---|---|---|---|
| | 1 | 000 | 001 | — | A | B | C | D | E | F | G | 00 | 100 | E | F | G | H |
| | | | | | | | | | | | | 01 | 001 | — | A | — | C |
| | | | | | | | | | | | | 10 | 010 | D | E | B | G |
| | 1 | 000 | 010 | — | — | A | B | C | D | E | F | 00 | 100 | D | E | F | B |
| | | | | | | | | | | | | 10 | 010 | — | — | A | A |
| | 1 | 000 | 011 | — | — | A | B | C | D | E | F | 01 | 011 | — | E | C | B |
| | 1 | 000 | 100 | — | — | — | A | B | C | D | E | 00 | 100 | B | C | D | A |
| | 1 | 000 | 101 | — | — | — | — | — | A | B | C | 01 | 101 | A | A | D | E |
| | 1 | 000 | 110 | — | — | — | — | — | A | B | C | 10 | 110 | — | — | — | — |
| | 1 | 000 | 111 | — | — | — | — | — | — | A | B | 01 | 111 | — | — | C | B |
| 8 Word Burst | 0 | 010 | 00000 | A | B | C | D | E | F | G | H | 11 | 00000 | A | B | C | B |
| | | | | | | | | | | | | | 00100 | E | F | G | H |
| | | | | | | | | | | | | 01000 | 01100 | J | F | L | P |
| | | | | | | | | | | | 11 | 10000 | M | K | N | O | T |
| | | | | | | | | | | | | | 10100 | Q | R | V | W | X |
| | | | | | | | | | | | 1100 | Y | | | | | |
| | | | | | | | | | | | | 11100 | Z | AA | AB | AC | AD | AE | AF |
| 8 Word Burst | 0 | 010 | 10000 | A | B | C | D | E | F | G | H | 11 | 10000 | A | B | C | D |
| | | | | | | | | | | | | | 10100 | E | F | G | H |
| | | I | J | K | L | M | N | O | P | | 11100 | I | J | K | L |
| | | Q | R | S | T | U | V | W | X | | 00000 | M | N | O | P |
| | | | | | | | | | | 11 | 00100 | Q | R | S | T |
| | | Y | Z | AA | AB | AC | AD | AE | AF | | 01100 | Y | Z | AA | AB |
| | | | | | | | | | | | | | AC | AD | AE | AF |

Once the cache arrangement (20 and 21) has been filled with valid tag information, most of the read transactions issued by processor 11 will read from the data cache 21. Write operations issued by processor 11 will update the cache, as well as the system DRAM 2 located on the motherboard via write-through operation. Note that clock cycles for the address and data buses 15 and 16 are half the frequency of the processor 11. Thus a 66 MHz processor clock results in a 33 MHz bus clock.

System ROM 25 is implemented to contain a large proportion of the operating system for processor 11. The ROM 25 is constructed via a set of four masked ROM devices arranged in 512K×16 construction to span the 64 bit data bus of processor 11. The ROM 25 is anticipated to have a burst mode read which allows the second though fourth beats of a burst read to be accomplished in half the time of the first access. The ROM modules are selected any where in the address range $4000 0000–$4FFF FFFF and $FF00 0000–$FFFF FFFF, in accordance with the address map shown in FIG. 3. Because the instruction set of processor 11 is incompatible with the instruction set of the host processor 1, the modules comprising ROM 4 on the motherboard are not necessary and cannot be accessed.

The BTU 12 has a mode bit to bypass the ROM 25 and allow access to certain components on the motherboard. The bypass mode is required to remove the ROM overlay of DRAM 2 located on the motherboard. The range $4100 0000 to $4FFF FFFF is sent to the motherboard in the bypass mode. Thus, application code should not be allowed to run in this address range when the bypass mode is activated. A non-burst word read from $4100 0000 is the recommended address to access during this mode.

In the event it is necessary or desirable, processor 11 can access DRAM system memory 2, I/O block 5, and other peripheral devices operating on the main processor board (e.g., NuBus cards). In particular, the cache 20–21 is normally accessed first for the entire DRAM address space ($0000 0000–$3FFF FFFF). If a read miss to caches 20–21 occurs, or if a write is issued to DRAM address space ($0000 0000–$3FFF FFFF) then the PowerPC processor transaction is encoded into a 68040 equivalent transaction, and the motherboard is accessed. Because the motherboard DRAM system memory 2 has a 32 bit wide data bus and the PowerPC has a 64 bit wide data bus 16 which can encode unaligned memory accesses, up to three 68040 cycles are needed to accomplish a single PowerPC memory access. Table 1a and 1b illustrate, all possible transactions between the PowerPC processor 11 and devices coupled to host system address/data bus 3 (FIG. 2). Since processor 11 has an internal cache, the ordinary accesses to system DRAM 2 should be controlled to be read and write bursts which can be efficiently translated.

The I/O and NuBus address spaces are assumed to be non-cacheable and the memory map should be encoded this way since the BTU 12 is depending on the Cache Inhibit signal to be correctly encoded. The BTU 12 uses write dumping to increase performance for byte, half word and word write operations. This means the BTU 12 will latch the write transaction to the motherboard and allow the processor 11 to continue with a normal termination. The BTU 12 will retry if the NuBus device indicates a retry is necessary. However, a bus error termination from the motherboard will not be reported to processor 11 from a write transaction. Alternatively, a read transaction will report the correct status because the processor 11 must wait for the data in any case. Thus, any searching of address spaces should always be done with reads to get the right answer.

Unlike prior art embodiments, the present invention substantially improves performance of 040-based computer systems at a fraction of the cost of a fully independent peripheral card. By sharing system memory, I/O and other principal functions with the host system, the peripheral card 10 of the present invention can be made smaller and less expensively than would be expected. The essential component of the bus translator (BTU 12) allows a fundamentally incompatible processor to share the host system's functionality while the host (processor 1) is disabled. Clearly, the present invention is inapplicable where it would be necessary to have both the host and peripheral systems simultaneously functioning.

BTU 12 is implemented using a 160 pin MQFP gate array with 0.8 micron technology. It is designed to interface the MPC601 RISC processor 11 to a Motorola 68040 system environment. BTU 12 translates all the MPC601 64-bit wide data to M68040 32-bit wide data bus transactions. BTU 12 supports all combinations of the MPC601 bus translation sizes and data alignments, and also provides the appropriate 68040 controls on the 68040 side of the integrated host-peripheral system (host 040 system with PowerPC peripheral card 10 installed).

BTU 12 additionally controls the 1 megabyte of level two (L2) cache. As previously stated, the L2 cache blocks 20 and 21 utilize a direct-mapped scheme with byte write allocation capability. Snooping is not supported and the MPC601 internal cache, the L2 external cache, and the main memory have consistent data at any given time. All write transactions issued by MPC601 (processor 11) are write through, and copy back mode is not supported. BTU 12 also controls ROM 25 with single and burst capabilities. BTU 12 supports standard as well as page mode ROM constructs, and supports flash EPROMs if programmed accordingly. BTU 12 provides the M68040 JTAG control signals to shut down the 68040 processor (processor 1) on the main motherboard during the boot up process, and provides the option to turn processor 1 back on after the shut down process.

Because the system memory and other functions of a computer employing the present invention are shared between incompatible processors, when the computer is first started, it is necessary to disable one of the two available processor systems. In the following section, disablement of the host 68040 system will be described. In a preferred implementation, the peripheral processor 11 contains an internal real time clock, which in addition to being used within the PowerPC processor 11, is also available at an output pin. The clock signal taken from processor 11 is applied to an input of BTU 12 together with a high frequency reference timing signal supplied by an oscillator circuit (not shown). The BTU 12 then divides down the clock signal supplied by processor 11 to generate a TCK signal which is subsequently delivered to the JTAG port of the 68040 processor 1.

BTU 12 has a series of control registers starting at address $5300 0000 which control the functions of the peripheral processor 11. BTU 12 has a four bit port 36 into the register set, and data bits D0–3 (IBM DH31-28) are read into or written from the processor 11. All registers can be read, and only the interrupt request register (IPL) cannot be written. If multiple functions are available within a single register, a read/modify/write sequence should be used to prevent unwanted changes to other bits in any register.

Table 2 below summarizes the registers and their functions:

TABLE 2

| | | BTU register set | | | |
|---|---|---|---|---|---|
| | Offset | Initial DDDD 3210 | Bit | State | Description |

Register Name

| | | | | | |
|---|---|---|---|---|---|
| ROM and MC68040 Alive | $00 | 0000 | D0 | 0 | Slow ROM speed. Page Mode Burst read is 6-4-4-4 cycles. Non-Page Mode Burst read is 6-5-5-5. Single read is 6 cycles. |
| | | | | 1 | Fast ROM speed. Page Mode Burst read is 5-3-3-3 cycles. Non-Page Mode Burst read is 6-4-4-4. Single read is 5 cycles |
| | | | D1 | 0 | Read only access to ROM. |
| | | | | 1 | Read and write access to Flash ROM. |
| | | | D2 | 0 | Non-Page Mode ROM. |
| | | | | 1 | Page Mode ROM. |
| | | | D3 | 0 | MC68040 is disabled. |
| | | | | 1 | MC68040 will be turned back on. This is a one way trip. If this bit is enabled the MC68040 will behave as though coming out of reset. The PPC601 must not make any further external accesses to the motherboard. |

Name

| | | | | | |
|---|---|---|---|---|---|
| Cache-Enable and Test Modes | $08 | 0000 | D0 | 0 | Cache disabled. |
| | | | | 1 | Cache enabled. The cache tags must be initialized and the memory map programmed before this is enabled. |
| | | | D1 | 0 | Cache Data SRAM write access is disabled. If a write occurs a bus error will be generated. |
| | | | | 1 | Cache Data SRAM can be read and written as 1 MB of SRAM organized as 128Kx64. This means only double word reads and writes can be used to access this memory. The base address is $5100 0000. Writes only work if the cache is disabled. |
| | | | D2 | 0 | Cache Tag SRAM write access is disabled. If a write occurs a bus error will be generated. |
| | | | | 1 | Cache Tag SRAM can be read and written as 64KB of SRAM organized as 32Kx13. Since the data from this memory must flow through the BTU only four bits of the 13 bit port can be read or written at a time. The base address is $5200 0000 with an offset of 3 address bits. Thus the first 16 bit entry is accessed by taking the low nibble of the following double word accesses $5200 0000, $5200 0008, $5200 0010, $5200 00180. Note that only D0 of $5200 0000 is implemented, the remaining bits are unknown. Writes only work if the cache is disabled. |
| | | | D3 | 0 | ROM accesses only to peripheral card. |

TABLE 2-continued

| | | BTU register set | | | |
|---|---|---|---|---|---|
| Name | Offset | Initial DDDD 3210 | Bit | State | Description |
| | | | | 1 | ROM accesses $4000 0000 to $40FF FFF will access the peripheral card ROM. A non-burst ROM access to addresses $4100 0000 to $4FFF FFFF will access the motherboard. This is used to eliminate ROM overlay on the motherboard at boot up. |
| Cache Clear and Reset Out | $10 | 0100 | D0 | 0 | No operation. |
| | | | | 1 | Clear valid bits in Cache Tag SRAM. This causes the BTU to take over the address bus and write 0 to the 32K valid bits in the Tag SRAM. The PPC601 doesn't need to check for completion as the bus will not be returned until the operation is complete. |
| | | | D1 | 0 | Cache entries from the ROM address range can be displaced. |
| | | | | 1 | Cache entries from the ROM address range will not be displaced. This is used to allow the MC68040 code emulator to remain resident in the Cache. |
| | | | D2 | 0 | Drive the Reset out signal of the MC68040 low to reset the motherboard. This is used to emulate the RESET instruction of the MC68040. |
| | | | | 1 | Drive the Reset out signal of the MC68040 high. This is the normal state. |
| | | | D3 | | Used as temporary software RAM. |
| Name | | | | | |
| Interrupt Mode and Pending | $18 | 0000 | D0 | 0 | Set interrupt when any IPL bit transitions. This is and edge triggered setting of a register. |
| | | | | 1 | Interrupt while any IPL is low. This is a level sensing interrupt. |
| | | | D1 | 0 | When read this indicates the edge triggered register is clear and no interrupt is pending. When written this clears the edge triggered interrupt. After clearing the IPL register should be read to be sure and interrupt has not occurred during the clearing operation. |
| | | | | 1 | When read this indicates an interrupt transition has been detected. It can be cleared by writing a zero to this register. |
| | | | D2 | | Unused. |
| | | | D3 | | Unused. |
| Name | | | | | |
| Interrupt levels | $20 | 0000 | D0 | | The current value of IPL bit 0. This is an active low signal. |
| | | | D1 | | The current value of IPL bit 1. This is an active low signal. |

TABLE 2-continued

| | | BTU register set | | |
|---|---|---|---|---|
| Offset | Initial DDDD 3210 | Bit | State | Description |
| | | D2 | | The current value of IPL bit 1. This is an active low signal. |
| | | D3 | | Unused. |

With respect to the Cache Enable and Test Modes register, in order to enable either the Cache or Tag SRAM test mode, external cache must be off. If Cache_enable is on and the Cache or Tag test mode is to be turned on, it is necessary to write to this register twice: the first time to turn off the cache_enable mode, and the second time to enable the Tag or Cache SRAM test. This gives the BTU internal logic enough time to recognize the correct state of CACHEN to allow the Cache or Tag SRAM check. Bit D3 of the Cache Enable and Test Modes register is used at the beginning of the boot sequence to allow the 601 processor to be able to get to the 68040 side to reset the ROM overlay logic of the memory controller. This bit should be cleared later to go back to the normal ROM range. Address bit 24 (A24) switches between the ROM range and disabled ROM range when D3 is set.

The Cache Invalidate and Reset mode enables the programmer to invalidate the entire tag memory by setting this bit. Before the programming process is complete, BTU 12 acquires control over the address bus 15 and automatically invalidates all the 32K of tag entries. The soft reset mode enables the software to assert a "processor direct" reset by writing a "0" to this bit. Normally, it is "1" and therefore, the processor direct reset is not active. Please note that extra care should be taken when programming the other bits; a logical "1" should be written into D2 bit location of this register so as to not generate the processor direct reset.

With respect to the Interrupt Detection and Pending Request Mode, interrupt detection mode provides the option between edge detection or level detection interrupt. If edge detection mode is selected, then the interrupt request register is used to indicate to processor 11 of a pending interrupt, and can be cleared by clearing this register. In the case of level detection option, the interrupt request register is not used and interrupts are cleared through external means (outside of BTU 12). There is a possibility that the interrupt register may get corrupted while clearing the interrupt request register in the edge detection case. This may occur if the interrupt lines change while the processor is writing a "0" into the register. While the change of the interrupt lines is detected and reported to the interrupt register, the processor can write a "0" and therefore clear the incoming interrupt request. This causes the loss of the new interrupt request. To prevent this problem, software should always read the values of the interrupt lines at the end of the interrupt handler routine after clearing the interrupt register to check if any more interrupts are pending. Additionally, in the edge detection mode a minimum of 10 BCLK bus clocks from the time 68040 interrupt lines change is needed by BTU 12 to start a write cycle to BTU's Interrupt Detection and Pending Request Mode register to clear the interrupt.

Finally, the reader should note that these two test modes should remain off during normal operation. They are implemented to break down the Tag Invalidate address Counter on BTU (a 15 bit counter) to two partitions, TAGA[11:5] and TAGA[19:12]. The first mode (mode 0) forces the first partition, TAGA[11:5], of the tag address to logic "1" and the second mode (mode 1) forces the second partition, TAGA[19:12] of the tag address to logic "1" and therefore reduce the count period drastically. It is highly recommended to read this register after clearing the interrupt bit (after writing '0' to this register). This would prevent any interrupt detection problems due to asynchronous IPL_ changes in the edge detection mode.

BTU 12 generates bus errors to processor 11 if the translated 601 to 040 cycle issued by BTU 12 results in a bus error response from any processor 1 slaves. BTU 12 then sends a bus error to processor 11. The first response from the 040 will determine whether a bus error occurred. Subsequent cycles by processor 1 in a burst transaction could only respond with a normal termination or bus retry (TA_and TEA from the 68040 side asserted at the same time). In the case of a bus error, the cache content could be replaced with stale data if the 601 cycle is either a burst read miss or a burst/single write hit cycle. Bus retry responses from the 040 side would cause BTU to repeat the 040 cycle again with MPC601 waiting for a response from BTU.

Figure 5:
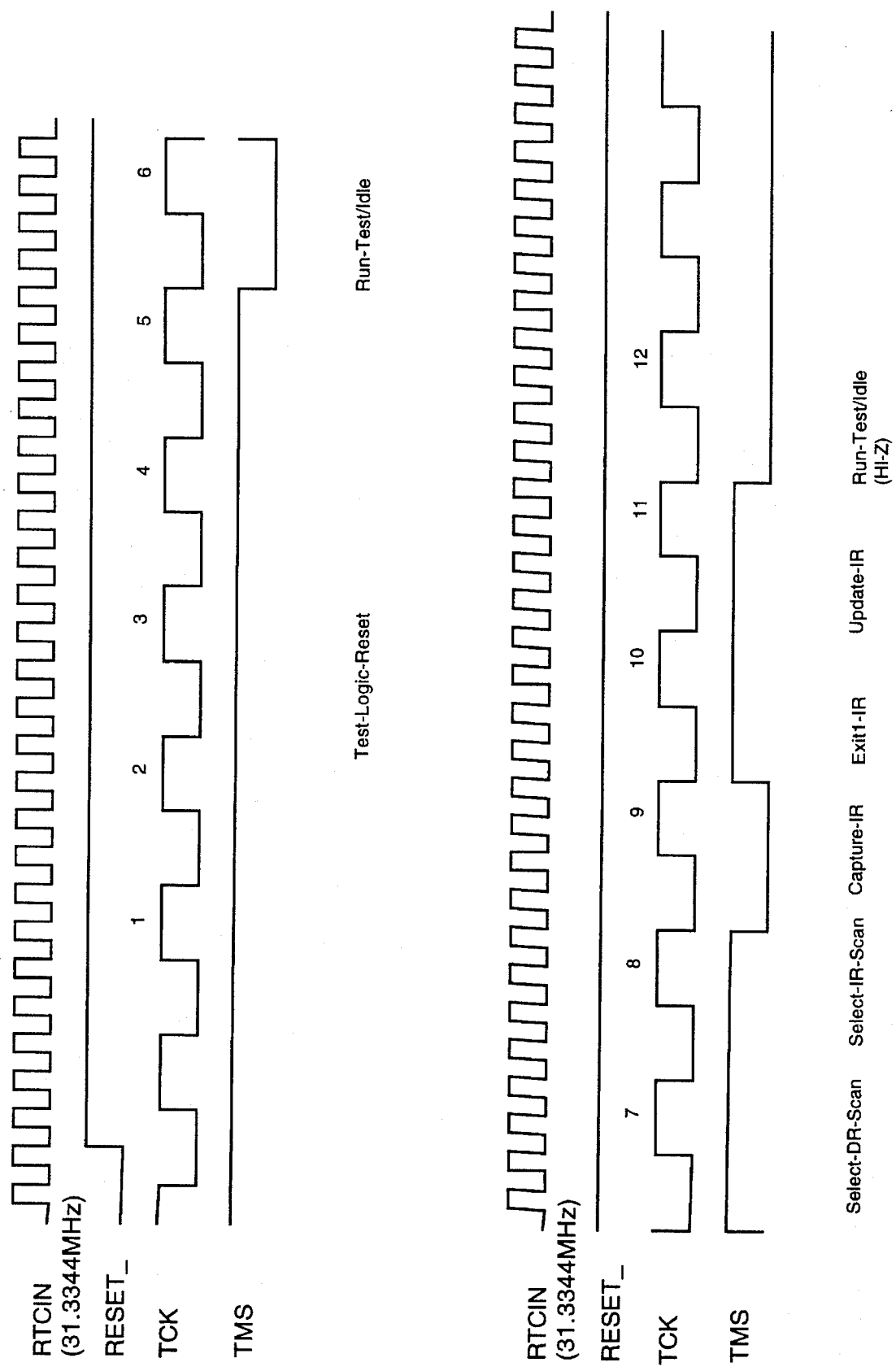
FIG. 5 illustrates the timing and control signals used to disable/shutdown the host processor.
Figure 6:
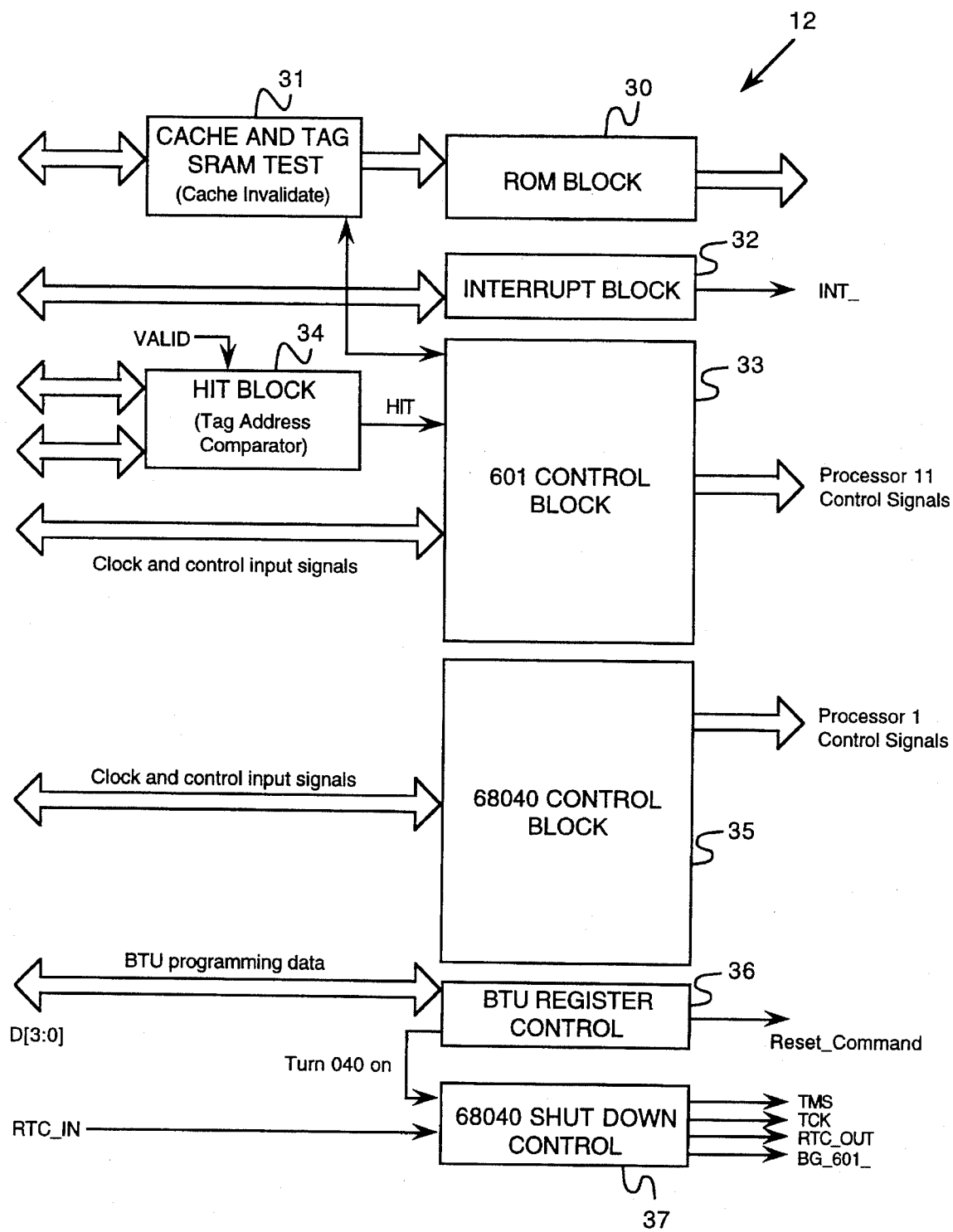
FIG. 6 is a block diagram illustration of the bus translator unit used to control which processor is activated.

The JTAG test port of the MC68040 is used to disable the MC68040 after the power-on fast reset line is inactivated. By shifting in the pattern shown in FIG. 5, it is possible to selectively place the host processor 1 into a high impedance "tristate" mode, thereby removing it from the rest of the computer system. The real time clock in (RTCIN) drives all functions, and inactivation is commenced by raising the reset line RESET_output of control 36 in BTU 12 to logic high. Thereafter, BTU 12 control 37 supplies output TCK and TMS signals as shown in FIG. 5 to the JTAG port of processor 1. As seen in FIG. 5, the 040 (processor 1) is placed in the inactive high impedance mode by the 12th transition of the TCK signal. The 68040 can be brought out of the inactive tristate mode by setting the appropriate mode bit (D3) in the "ROM and 68040 Alive" register, shown in Table 2 above. However, if the 68040 is brought back alive, it is important that processor 11 not be allowed to make another access to the motherboard until the entire system (host and peripheral) is reset, otherwise an unrecoverable error due to memory space overlap will occur. Because PowerPC processor 11 is capable of substantially higher performance than is the 040 processor 1, it is highly unlikely that any user would choose to use the 040 processor while the PowerPC peripheral card installed in the host system. Accordingly, it is recommended that the user not set bit D3 within the ROM and MC68040 Alive control register within BTU 12 so that the 040 is activated while the peripheral card is installed in the host computer.

Once the peripheral processor card 10 is operational, BTU 12 controls and performs several different bus cycles. Below is a summary of the various bus cycles controlled by BTU 12, together with the number of clock cycles required by each bus transaction:

```
(I) Cache Hit Cycles:
    READ:
        ROM Singles:               3
        ROM Bursts:                MODE0     MODE1
                                   2-1-1-1   2-1-1-1
        601 to 040 singles:        3
        601 to 040 Burst:          2-1-1-1
    WRITE:
        ROM Singles:               Same As Cache Miss
        ROM Bursts:                Not Valid
        601 to 040 Singles:   Same As Cache Miss
        601 to 040 Bursts:    Same As Cache Miss
(II) Cache Miss Cycles:
    READ:
        ROM Singles (Page Mode):       MODE0     MODE1
                                       6         5
        ROM Burst (Page Mode):         MODE0     MODE1
                                       6-4-4-4   5-3-3-3
        ROM Singles (Standard Mode):   MODE0     MODE1
                                       6         6
        ROM Burst (Standard Mode):     MODE0     MODE1
                                       6-5-5-5   6-4-4-4
        601 to 040 Singles:       3+X
where X= Number of BCLK clocks it takes the 68040 slaves to
respond. Please note that single 601 cycles could be broken up to
4 single 68040 cycles by the BTU. If the cycles are broken into
more than one 68040 cycle, the formula changes to:
3+X + a(2+X) where a is the number of 68040 cycles – 1;
        601 to 040 Bursts:        4+2Y
Where Y= total number of cycles it takes the 68040 slave to
respond to a burst cycle.
    WRITE:
        ROM Singles (Flash mode):    6
        ROM Bursts (Flash mode):     Not Valid
        601 to 040 Singles:     4
NOTE: BTU responds to 601 in a fixed time frame due to the
dump and run mechanism. In other words,
        601 to 040 Bursts:
(III) Address Only cycles:
        Address Only:    3
(IV) BTU Register Cycles:
    READ:
        Access Cache Invalidate Register:
        Access All Other Registers:    4
```

BTU 12 not only supports page mode ROMS, it also supports standard ROMS. In addition, two speed modes are provided which support ROM speeds of up to 150 ns. An option is provided to enable write operations to Flash EPROMs. The two ranges, 40000000'h-4FFFFFFF'h and FF000000'h-FFFFFFFF'h, are used to access the ROM space. Tag and Cache SRAMs are allowed to be tested. When the test modes are enabled by programming BTU 12, any data can be written to or read back from the SRAMs. In order to do a write cycle to either Cache or Tag SRAMs during testing, both TAGTESTEN and CACHTESTEN programmable bits should be turned on along with CACHEN bit turned off. It is important to note that L2 cache should be off before testing the tag or Cache SRAMs.

Any entry in the cache SRAMs could be accessed by addressing 510XXXXX range. A28 to A12 determines the cache SRAM beat entry. The data D<63:0> could be written to and read from the cache SRAMs by the range 51000000 to 510FFFF8.

Figure 7:
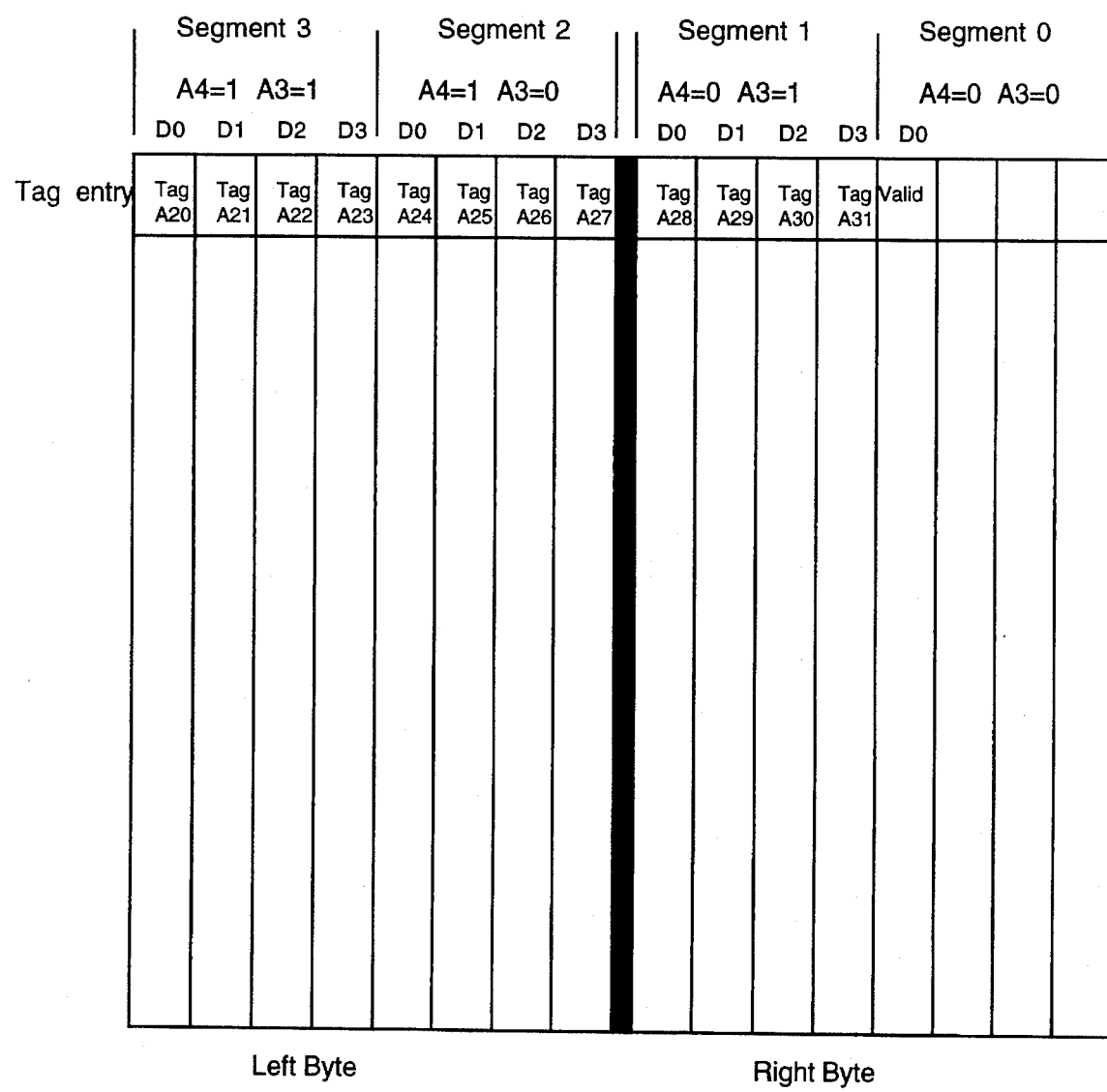
FIG. 7 is a tag cache segment map as implemented in the peripheral processor card of the present invention.
Figure 8:
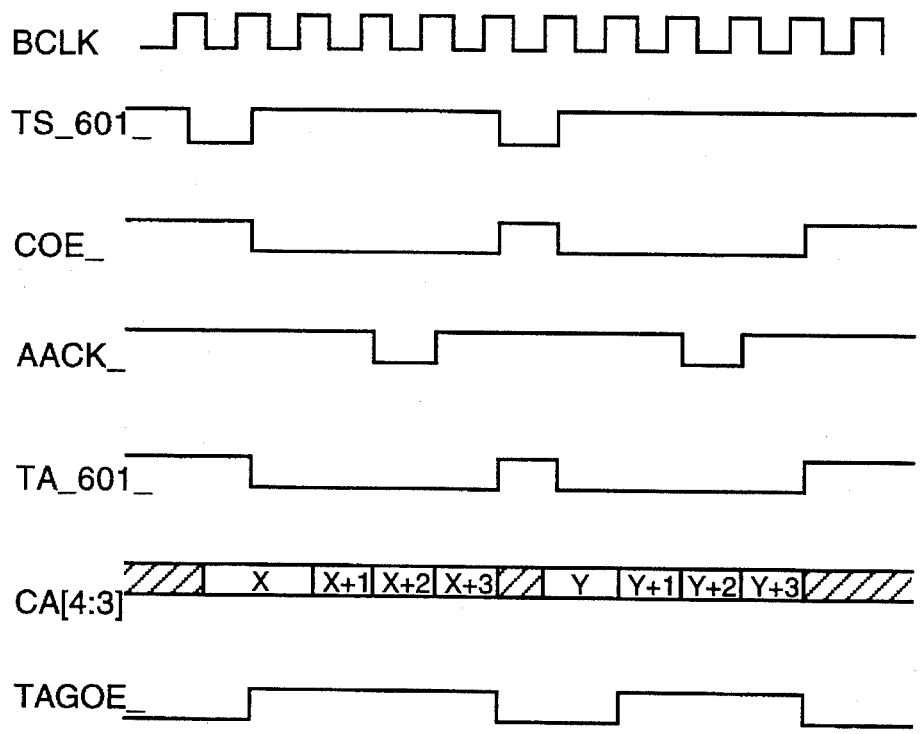
FIG. 8 is a timing diagram illustrating a bus transaction comprising two back-to-back read operations.
Figure 8:
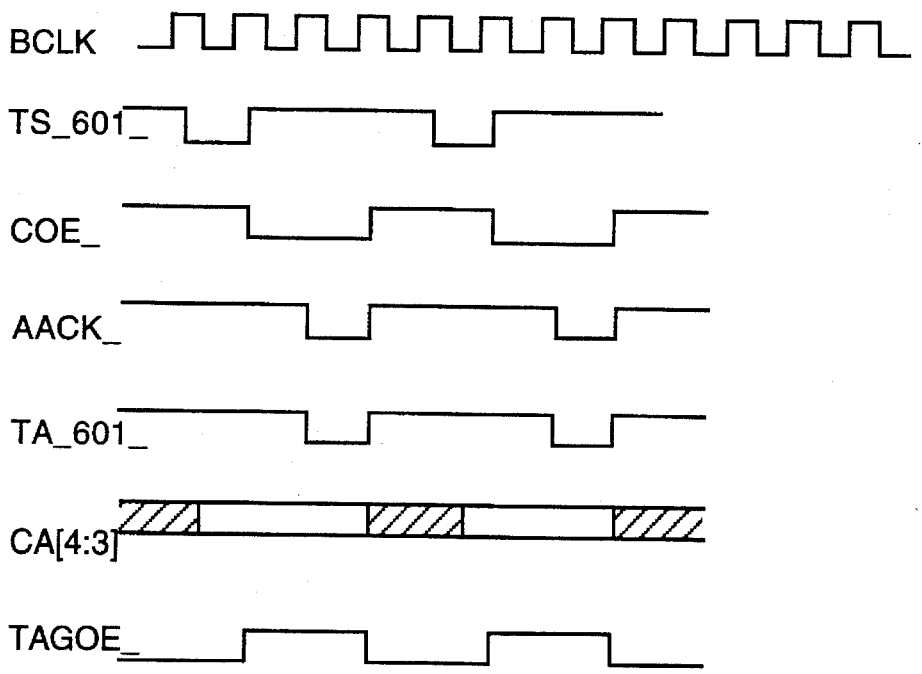

The access to tag SRAM (block 20) is not as trivial as the cache SRAM. The tag SRAM access is more involved since the tag SRAM data bus is only used by BTU and is different from the rest of the system data bus. The contents of the tag SRAMs could only be accessed through BTU and indirectly by BTU's only four data bits D<3:0> that are shared with the rest of the MPC601 system data bus. All the tag entries could be accessed by addressing 520XXXXX range. FIG. 7 illustrates the map between the tag entry and the BTU data bus 16 and the addresses used to individually access each segment of the tag entry. As set out above, two 32K×8 SRAMS form the Tag Memory (block 20). It is important to note that if ranges 510XXXXX or 520XXXXX are accessed for writes without enabling the tag or cache enable bits, BTU 12 would initiate a bus error cycle in response to the cycle requested by processor 11. Accessing those ranges for reads would proceed normally without enabling the tag or cache bits. This is due to the fact that reads do not change the content of either SRAM, unlike writes which could stale the data in the cache or address in the tag SRAMs.

To perform a successful write to either tag or cache SRAMs during testing, L2 cache should be turned off by clearing the CACHEN programmable bit. Since there are a total of 13 bits per tag entry and only four data bits D<3:0> to access each entry, through BTU, each tag entry is broken up into four segments that are individually accessed by A<4> and A<3>. By reading the content of the tag SRAM one beat at a time, only four bits are read and therefore four seperate beat reads should be performed to write to or read from the tag entry.

The foregoing has described methods and apparatus for upgrading an 040-based personal computer system using an optional, peripheral add-in card. Although the foregoing has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention, the scope of the invention being limited only by the following claims.

We claim:

1. A cache memory arrangement for improving bus latency during burst read operations, comprising:

a uniprocessor single bus master;

an address bus coupled to said bus master;

a data bus coupled to said bus master;

a cache memory block, comprising a tag cache and a data cache, and being coupled to said address bus and to said data bus;

an address latch, coupled between said address bus and said data cache, for receiving a current cache address signal corresponding to a first burst read operation and maintaining said current signal after a second burst read operation is initiated and until the first burst read operation is completed; and a bus translator unit coupled to the address bus and to the data bus; and wherein the bus master generates the current cache address signal; and the bus translator unit generates an active latch control signal which causes said address latch to store the current cache address signal, then generates an inactive latch control signal which causes said address latch to maintain the current cache address signal, and then generates an address acknowledge signal which causes said bus master to release the current cache address signal and issue a subsequent cache address signal before the first burst read operation is completed.

2. A cache memory arrangement for improving bus latency during burst read operations, comprising:

a processor which issues a first address signal specifying a first burst read operation, and afterwards issues a second address signal specifying a second burst read operation before the first burst read operation has been completed;

a peripheral bus comprising an address bus and a data bus coupled to said processor for communicating said address signals;

an address latch coupled to said peripheral bus for latching the first address signal until the first burst read operation has been completed, and then latching the second address signal;

a cache memory block coupled to said latch and to said peripheral bus, and addressable by any address signal latched in said address latch;

a bus translator unit coupled to said peripheral bus, for generating data bus control signals;

wherein:
the processor issues address signals on the address bus;
the bus translator unit generates active and inactive address latch signals;
the address latch has a latch input terminal connected to the address bus, and a latch output terminal connected to the cache memory block, and is responsive to active address latch control signals to latch any address signal from the latch input terminal and hold the latched address signal;
the bus translator unit, after generating an active address latch control signal, generates an acknowledge signal which causes the processor to issue the second address signal; and
upon completion of the first burst read operation, the bus translator unit generates a subsequent active address latch control signal which causes the address latch to release the first address signal and to latch the second address signal.

3. A cache memory system for improving bus latency during back-to-back first and second burst read operations, comprising:

a processor generating address signals including a first address signal corresponding to a first burst read operation;

an address bus coupled to the processor, and receiving the address signals generated by the processor;

a data bus coupled to the processor;

a cache memory block, including a cache tag memory and a cache data memory, coupled to the address bus and to the data bus;

a bus translator unit coupled to the address bus and to the data bus, and generating active and inactive address latch control signals;

an address latch coupled between the address bus and the cache memory block and responsive to an active address latch control signal to store an address signal from the address bus, and responsive to inactive address latch control signals to hold the address signal; and wherein the bus translator unit generates an active latch control signal which causes the address latch to store the first address signal, generates an inactive address latch control signal while the first burst read operation is in progress, generates an address acknowledge signal which causes the processor to generate before the first burst read operation is completed a second address signal corresponding to a second burst read operation, and when the first burst read operation has been completed generates an active address latch control signal which causes the address latch to store the second address signal.

4. A cache memory arrangement for improving bus latency during burst read operations, comprising:

a processor which generates a current cache address signal;

an address bus coupled to said processor;

a data bus coupled to said processor;

a cache memory coupled to said address bus and to said data bus;

an address latch, coupled between said address bus and said cache memory, for receiving a current cache address signal corresponding to a first burst read operation and maintaining said current cache address signal after a second burst read operation and until said first burst read operation is complete; and a bus translator unit, coupled to said address bus and to said data bus, and generating
an active latch control signal to store said current cache address signal in said address latch,
an inactive latch control signal to maintain said current cache address signal in said address latch, and
an address acknowledge signal to cause said processor to release said current cache address signal; and
wherein
said processor issues a subsequent cache address signal before said first burst read operation is completed.

5. A memory arrangement for improving bus latency during burst read operations, comprising:

a processor which issues
a first address signal specifying a first burst read operation, and
a second address signal specifying a second burst read operation before said first burst read operation has been completed;

a bus including an address bus and a data bus, coupled to said processor for communicating said address signals;

an address latch, coupled to said busy for latching said first address signal until said first burst read operation has been completed, and then latching said second address signal;

a memory coupled to said latch and to said bus; and a bus translator unit coupled to said bus and generating bus control;

wherein:
said processor issues address signals on said address bus;
said bus translator unit generates active and inactive address latch control signals;
said address latch has a latch input terminal connected to said address bus, has a latch output terminal connected to said memory, and is responsive to said active address latch control signals to latch said address signals from said latch input terminal;
said bus translator unit, after generating an active address control signal, generates an acknowledge signal which causes said processor to issue said second address signal; and
said bus translator unit, upon completion of said first burst read operation, generates a subsequent active address latch control signal which causes said address latch to release said first address signal and to latch said second address signal.

* * * * *

UNITED STATES PATENT AND TRADEMARK OFFICE
CERTIFICATE OF CORRECTION

PATENT NO. : 5,603,007
DATED : February 11, 1997
INVENTOR(S) : Yazdy, et al.

It is certified that error appears in the above-identified patent and that said Letters Patent is hereby corrected as shown below:

In the claims:

Claim 5 Column 32, line 39, please delete "busy" and insert - -bus- -.

Signed and Sealed this

Eighteenth Day of May, 1999

Attest:

Q. TODD DICKINSON

*Attesting Officer*    *Acting Commissioner of Patents and Trademarks*